(12) United States Patent
Liu et al.

(10) Patent No.: US 9,288,250 B2
(45) Date of Patent: Mar. 15, 2016

(54) MOBILE MULTIMEDIA REAL-TIME TRANSCODING SYSTEM, APPARATUS, STORAGE MEDIUM AND METHOD

(75) Inventors: Gang Liu, Nanshan Futian (CN); Yan Huang, Nanshan Futian (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/345,225
(22) PCT Filed: Jul. 13, 2012
(86) PCT No.: PCT/CN2012/078636
§ 371 (c)(1),
(2), (4) Date: Mar. 26, 2014
(87) PCT Pub. No.: WO2013/037241
PCT Pub. Date: Mar. 21, 2013

(65) Prior Publication Data
US 2014/0344415 A1    Nov. 20, 2014

(30) Foreign Application Priority Data
Sep. 16, 2011   (CN) .......................... 2011 1 0276066

(51) Int. Cl.
*G06F 15/16* (2006.01)
*H04L 29/06* (2006.01)
(Continued)

(52) U.S. Cl.
CPC ........ *H04L 65/607* (2013.01); *G06F 17/30905* (2013.01); *H04L 65/601* (2013.01);
(Continued)

(58) Field of Classification Search
CPC .................... H04N 19/00472; H04N 21/2343; H04N 21/234309; H04N 21/440218; H04L 65/4084; H04L 65/440218; H04L 65/601; H04L 65/607; H04L 67/2823

USPC ......................................... 709/219; 707/618
See application file for complete search history.

(56) References Cited

U.S. PATENT DOCUMENTS

2003/0028647 A1*  2/2003  Grosu ................. H04L 12/5835
                                                           709/227
2003/0158913 A1*  8/2003  Agnoli .................... H04L 29/06
                                                           709/219
(Continued)

FOREIGN PATENT DOCUMENTS

CN         101420452 A     4/2009
CN         101945278 A     1/2011
(Continued)

OTHER PUBLICATIONS

International Search Report for PCT/CN2012/078636 mailed on Oct. 18, 2012 in 2 pages.
(Continued)

*Primary Examiner* — Jeong S Park
(74) *Attorney, Agent, or Firm* — Knobbe Martens Olson & Bear LLP

(57) ABSTRACT

An example of the present disclosure provides a mobile multimedia real-time transcoding system based of offline downloading. The system includes: a client, to submit an offline downloading and transcoding task request to the task scheduling and managing server, wherein the offline downloading and transcoding task request comprises a target mobile device type selected by a user and a target format designated by the user, and obtain a requested multimedia resource; the offline downloading and transcoding server cluster is distributed and is adapted to accept scheduling of the task scheduling and managing server, perform an offline downloading and transcoding task in a manner of performing offline downloading and transcoding in parallel.

7 Claims, 3 Drawing Sheets

(51) Int. Cl.
*H04N 21/2343* (2011.01)
*G06F 17/30* (2006.01)
*H04N 19/162* (2014.01)
*H04N 19/164* (2014.01)
*H04N 19/40* (2014.01)
*H04N 21/4402* (2011.01)
*H04L 29/08* (2006.01)
*H04N 19/436* (2014.01)

(52) U.S. Cl.
CPC ........... *H04N19/162* (2014.11); *H04N 19/164* (2014.11); *H04N 19/40* (2014.11); *H04N 21/2343* (2013.01); *H04L 67/2823* (2013.01); *H04N 19/436* (2014.11); *H04N 21/4402* (2013.01)

(56) References Cited

U.S. PATENT DOCUMENTS

| | | | |
|---|---|---|---|
| 2004/0193648 A1* | 9/2004 | Lai | H04N 7/17318 |
| 2006/0245490 A1 | 11/2006 | Yoshizawa et al. | |
| 2009/0019492 A1* | 1/2009 | Grasset | G11B 27/034 725/45 |
| 2010/0115575 A1* | 5/2010 | Yu | H04N 7/17318 725/142 |
| 2010/0281042 A1* | 11/2010 | Windes | H04N 7/17327 707/756 |
| 2011/0060721 A1* | 3/2011 | Chalouhi | H04L 67/104 707/622 |
| 2014/0165119 A1* | 6/2014 | Liu | H04N 21/232 725/92 |
| 2014/0229582 A1* | 8/2014 | Liu | H04L 67/06 709/219 |

FOREIGN PATENT DOCUMENTS

| | | |
|---|---|---|
| CN | 101977228 A | 2/2011 |
| CN | 102143385 A | 8/2011 |
| JP | 09-016487 A | 1/1997 |
| JP | 2004-526227 A | 8/2004 |
| JP | 2006-311267 A | 11/2006 |
| JP | 2007-506368 A | 3/2007 |
| JP | 2007-235865 A | 9/2007 |
| JP | 2011-119859 A | 6/2011 |
| TW | 200904191 A | 1/2009 |
| WO | WO 02/052730 | 7/2002 |
| WO | WO 2005/029237 | 3/2005 |
| WO | WO 2010/063324 | 6/2010 |

OTHER PUBLICATIONS

Written Opinion of the International Search Authority for PCT/CN2012/078636 mailed Oct. 18, 2012 in pages (English Translation in 11 pages).

International Preliminary Report and Written Opinion of the International Searching Authority for International Application No. PCT/CN2012/078636, issued on Mar. 18, 2014, in 12 pages.

Office Action for Japanese Patent Application No. 2014-530082, mailed on May 18, 2015.

Sambe et al., "A Distributed High Speed Video Transcoding System," Symposium on Multimedia, Distributed, Cooperative and Mobile Systems (DICOMO 2003), Japan, Information Processing Society of Japan, vol. 2003(9), pp. 409-412 (publication showing well-known technology) (Jun. 4, 2006).

* cited by examiner

MOBILE MULTIMEDIA REAL-TIME TRANSCODING SYSTEM, APPARATUS, STORAGE MEDIUM AND METHOD

CROSS-REFERENCE TO RELATED APPLICATIONS

This application is a U.S. National Phase application under 35 USC. §371 of International Application No. PCT/CN2012/078636, filed Jul. 13, 2012, entitled 'MOBILE MULTIMEDIA REAL-TIME TRANSCODING PLAYING SYSTEM, DEVICE, STORAGE MEDIUM AND METHOD', which claims priority to the Chinese Patent Application No. 201110276066.X, filed Sep. 16, 2011, the entire contents of each application are incorporated herein by reference.

FIELD OF THE DISCLOSURE

The present disclosure relates to real-time transcoding techniques, and more particularly, to a mobile multimedia real-time transcoding server based on offline downloading, a client, a system, a storage medium and a method thereof.

BACKGROUND OF THE DISCLOSURE

Mobile video refers to a service such as live broadcasting, broadcasting on demand and downloading of various video/audio contents including movies, entertainments, original works, sports, music, which are provided to users via mobile devices and based on a mobile network. The mobile network includes a general packet radio service (GPRS) network, an enhanced data rate for GSM evolution (EDGE) network, a 3rd generation (3G) network, or a wireless fidelity (WiFi) network, etc. With the rapid development of multimedia and computer techniques, video playing and applications have gained a big success on personal computers (PCs). With the coming of the 3G era, mobile videos become increasingly hot and demands for mobile videos show an explosive growth. Desires of users of visiting multimedia resources anytime and anywhere increase with time.

The playing of a video on a mobile device usually involves a video format conversion problem. Most existing mobile videos need to be processed by a format converting system, i.e., the video program is transcoded according to a specific format and code rate. The processed video program is fit for being played on the mobile device. At present, a format converting system includes a video convertor, an audio convertor, a picture format convertor, a document format converter, etc. With the development of the Internet and the mobile network, there are more and more media playing platforms. Thus, the media platforms support more and more media formats. From cellphone, to IPTV, to high definition digital broadcast, different platforms have different requirements on the formats of the contents, such as encoding format, resolution, and frame rate. Therefore, conversion of content encoding format becomes indispensable.

At present, there are three transcoding requirements: 1) conversion requirement between different video formats, e.g., from moving pictures experts group/motion pictures experts group (MPEG)-2 or MPEG-4 to H.264. 2) Content transmitting requirement: it is required to change the bit rate to meet requirements of different network bandwidths or device playing speeds. 3) Definition requirement: it is required to convert a high definition video to a standard definition video or a low definition video, or vice versa. An example is as follows. In order to edit information and upload the information to a website such as YouTube, a video needs to be transmitted from a camera to a PC. During the transmission of the video data, the conversion is performed, e.g., from the camera (audio video interleaved (AVI) format) to the PC (MPEG-2 for editing or MPEG-4 for storage) and then to the website (H.263/H.264/Flash). If a file on the website needs to be played on the PC, the transcoding is performed to the file to play the file by RealPlayer or Windows Media Player software.

There are the following two manners to enable a user to watch a mobile video on a mobile device.

In one manner, the network is searched for a video in a video format can be played on the mobile device. The video is downloaded to the mobile device for play or is played online. If the video is downloaded to the mobile device for play, dedicated downloading software is usually required. After a long time, downloading of the video is finished and then the video can be played. If the video is played online a website needs to prepare a transcoded target video in advance.

In the other manner, a format conversion is performed using a local transcoding system of the client that the user logs in. Dedicated transcoding software is installed in the mobile device. An original file which needs to be transcoded is imported into the transcoding software. The user may configure transcoding parameters related to a target format to be outputted, such as target file name, code rate, split the video or not, etc. Then the transcoding is started. After the transcoding, it is synchronized on the mobile device again. This manner is not fit for playing on the mobile device. The transcoding procedure on the client is very complicated and is time consuming.

SUMMARY OF THE DISCLOSURE

Examples of the present disclosure provide a mobile multimedia real-time transcoding server based on offline downloading, a client, a system, a storage medium and a method thereof, so as to realize real-time transcoding and improve a playing effect.

According to an example of the present disclosure, a mobile multimedia real-time transcoding method based on offline downloading is provided. The method includes:

receiving, by a server side, an offline downloading and transcoding task request submitted by a client, wherein the offline downloading and transcoding task request comprises a target mobile device type selected by a user or a user designated target format; and performing, by the server side, an offline downloading and transcoding task following scheduling and in a manner of performing offline downloading and transcoding in parallel according to the target mobile device type selected by the user or the user designated target format carried in the offline downloading and forwarding task request submitted by the client, and providing an obtained multimedia resource to the client.

According to another example of the present disclosure, a mobile multimedia real-time transcoding server based on offline downloading is provided. The server includes: a task scheduling and managing server, an offline downloading and transcoding server cluster, a storage server; wherein the task scheduling and managing server is adapted to transmit an offline downloading and transcoding task request of a client, and schedule the distributed offline downloading and transcoding server cluster;

the offline downloading and transcoding server cluster is distributed and is adapted to accept scheduling of the task scheduling and managing server, perform an offline downloading and transcoding task in a manner of performing offline downloading and transcoding in parallel according to a target mobile device type selected by the user or a target format designated by the user; and the storage server is adapted to store a multimedia resource which is downloaded and transcoded by the offline downloading and transcoding server cluster.

According to still another example of the present disclosure, a client is provided. The client includes a generating module and a transmitting module; wherein the generating module is adapted to generate an offline downloading and transcoding task request, wherein the offline downloading and transcoding task request comprises a target mobile device type selected by a user and a target format designated by the user; and the transmitting module is adapted to transmit the offline downloading and transcoding task request to a server side, so as to obtain a requested multimedia resource from the server side.

According to yet another example of the present disclosure, a mobile multimedia real-time transcoding system is provided. The system includes: a client, a task scheduling and managing server, an offline downloading and transcoding server cluster and a storage server; wherein the client is adapted to submit an offline downloading and transcoding task request to the task scheduling and managing server, wherein the offline downloading and transcoding task request comprises a target mobile device type selected by a user and a target format designated by the user, and obtain a requested multimedia resource;

the task scheduling and managing server is adapted to transmit an offline downloading and transcoding task request of a client, and schedule the distributed offline downloading and transcoding server cluster;

the offline downloading and transcoding server cluster is distributed and is adapted to accept scheduling of the task scheduling and managing server, perform an offline downloading and transcoding task in a manner of performing offline downloading and transcoding in parallel according to a target mobile device type selected by the user or a target format designated by the user; and the storage server is adapted to store a multimedia resource which is downloaded and transcoded by the offline downloading and transcoding server cluster.

According to yet another example of the present disclosure, a non-transitory computer-readable storage medium comprising a set of instructions for implementing a mobile multimedia real-time transcoding method is provided, the method includes:

receiving, by a server side, an offline downloading and transcoding task request submitted by a client, wherein the offline downloading and transcoding task request comprises a target mobile device type selected by a user or a user designated target format; and performing, by the server side, an offline downloading and transcoding task following scheduling and in a manner of performing offline downloading and transcoding in parallel according to the target mobile device type selected by the user or the user designated target format carried in the offline downloading and forwarding task request submitted by the client, and providing an obtained multimedia resource to the client.

According to examples of the present disclosure, a server side performs the offline downloading and transcoding task in a manner of performing offline downloading and transcoding in parallel according to a target mobile device type selected by the user or a user designated target format carried in the offline downloading and transcoding task request submitted by the user. The server side provides the obtained multimedia resource to the client.

According to the examples of the present disclosure, the offline downloading and transcoding task can be performed according to the target mobile device type selected by the user or the user designated target format, source of the resource is not restricted. Thus, various requirements of the user can be met. The offline downloading and transcoding task is performed following scheduling in the manner of performing the offline downloading and transcoding in parallel, which saves time, realizes dynamic and balanced scheduling and realizes real-time transcoding. Thus, the playing effect is improved.

DETAILED DESCRIPTION OF THE DISCLOSURE

Figure 1:
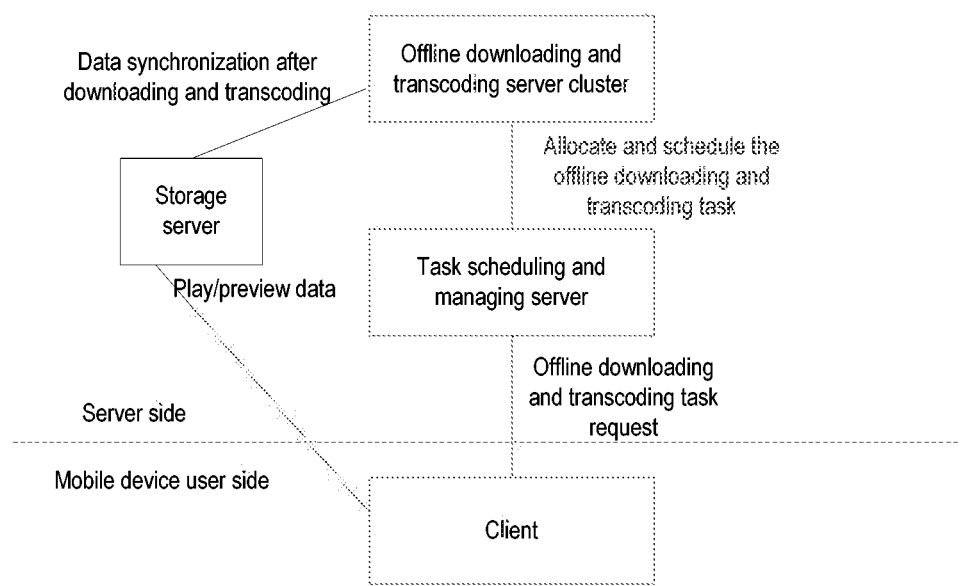
FIG. 1 is a schematic diagram illustrating a structure of a system according to an example of the present disclosure.

In one manner to enable a user to watch a mobile video on a mobile device, the network is searched for a video in a video format can be played on the mobile device. The video is downloaded to the mobile device for play or is played online.

In this manner, the user has to find a video format fit for being played on the mobile device, e.g., 3GP (a video encoding format of 3G streaming media). Since video resources whose formats have been converted are adopted, the source of the multimedia resource is limited to existing formats. Not all of the video resources can be selected and played. The manner of finding a ready-to-play format restricts the source of the video resource. If the video file fit for being played on the mobile device is not found, an original video file has to be downloaded. This procedure requires long time waiting, which wastes time and consumes much bandwidth. Then, the video transcoding is performed before synchronizing the video resource to the mobile device for playing. Even if the video is on an online website, the video cannot be used before being pre-transcoded by the website. Thus, according to this manner, the source of the video resource is restricted. The user is restricted in few selections. In addition, the format and code rate of the transcoding are fixed. It is hard to achieve a balance between definition and fluency according to each user's requirement.

In another manner to enable a user to watch a mobile video on a mobile device, a format conversion is performed using a local transcoding system of the client that the user logs in. Dedicated transcoding software is installed in the mobile device. An original file which needs to be transcoded is imported into the transcoding software.

In this manner, the user has to obtain a video file in a conventional format and then performs a video format transcoding at the client end. Thereafter, the video file is imported into the mobile device for watching. Through the transcoding at the client end, although source of the video resource is not restricted, this manner requires the user knowing many encoding techniques, e.g., resolution, code rate and frame rate, etc. Not all of the users know the knowledge. Thus the user group is limited. For the resolution, the video resolution supported by each type of mobile device has an upper limit. Most of them do not support videos with resolutions exceeding a screen physical resolution of the mobile device. For the code rate, the code rate supported by each type of mobile device also has an upper limit, usually below 1 Mbps. For the frame rate, recent mobile devices support 30 frames per second (fps) at most.

In addition, video transcoding is a procedure with a high computation load. Operations including decoding, video filtering/image processing, and encoding according to an output format need to be performed to the input video stream. The transcoding (especially video transcoding) is a time consuming and resource consuming procedure, especially for high definition videos. Whether the former or the latter manner is adopted, the initiation and execution of the transcoding is processed centrally, which requires a long waiting time and occupies much central processing unit (CPU) processing time. For the mobile device, it is impossible to perform a large amount of dynamic complicated decoding. Even if the newest type cell phone is adopted, there are also limitations on parameters for supporting videos. In addition, according to conventional transcoding technique, data cannot be shared. For the same file, if one user needs to transcode this file, after the file is transcoded at the client end of the user, other users have to perform local transcoding operation again if they require the same file.

Examples of the present disclosure adopt a real-time transcoding technique. In this technique, a mobile device user submits a watching request for watching a multimedia resource. A transcoding system presents the multimedia resource to the user for watching in real-time according to the request. According to a target mobile device type selected by the user or a user designated target format, an offline downloading server downloads corresponding contents according to a downloading and transcoding task request submitted by the user via a client that the user logs in. The contents are automatically transcoded at the offline downloading server side. Alternatively, an appropriate content resource may be found at the offline downloading server side. Thus, multimedia resources from different sources may be integrated and visited via a uniform interface. According to the target mobile device type selected by the user when initiating the offline downloading and transcoding task, the downloading and transcoding may be performed in parallel, i.e., transcoding while downloading. The user does not need to wait for the complete of the downloading before starting the transcoding. The real-time transcoding is realized. Once there is transcoded data, a preview may be provided on the mobile device, which facilitates the user to determine whether he wants the transcoded contents. A preview of the transcoded contents may be provided to the user. At the same time, the user is allowed to select a position to start the transcoding not from the beginning, i.e., a preview of different parts of the file may be provided to the user. The solution of the present disclosure is compatible with mobile multimedia applications. Since the target mobile device type selected by the user or the user designated target format is submitted, the multimedia watched by the user on the mobile device is tailored for the mobile device. Therefore, a balance is realized between a watching definition and a watching fluency.

The multimedia transcoding is a time-consuming and resource-consuming procedure. The situation becomes even worse for high definition multimedia. In examples of the present disclosure, a distributed cluster technique is adopted. Different from conventional central processing, the distributed cluster technique increases the speed of the multimedia transcoding procedure. In the cluster technique, a distributed system consists of PC servers replaces a large scale machine. The distributed processing realizes scheduling and management with a high efficiency. Multiple downloading and transcoding tasks may be executed in parallel. Thus, throughput and efficiency of the transcoding are increased. The cluster is transparent for the user. The user does not need to know technical details of the cluster. The user only needs to submit a download/transcoding task to a cluster node at the server side, and retrieve required multimedia resource from a specific position after the transcoding is finished.

Hereinafter, the present disclosure is described in further detail with reference to accompanying drawings and examples to make the technical solution and merits therein clearer.

A mobile multimedia real-time transcoding system based on offline downloading is as shown in FIG. 1. The system includes: a client at a mobile device side of the user, a task scheduling and managing server at a server side, an offline downloading and transcoding server duster at the server side, and a storage server at the server side. The client is adapted to transmit an offline downloading and transcoding task request to the task scheduling and managing server, wherein the request carries a target mobile device type selected by the user and a target format designated by the user. The client is also adapted to obtain the requested multimedia resource. The task scheduling and managing server is adapted to manage a list of offline downloading and transcoding tasks, transmit the offline downloading and transcoding task request of the client, and schedule the distributed offline downloading and transcoding server cluster. The offline downloading and transcoding server cluster is distributed, adapted to be scheduled by the task scheduling and managing server, perform an offline downloading and transcoding task in a manner of performing offline downloading and transcoding in parallel according to the target mobile device type selected by the user and the target format designated by the user. The storage server is adapted to store the multimedia resource which is downloaded and transcoded by the offline downloading and transcoding server cluster.

It should be noted that, the offline downloading refers to that a server of a downloading tool of the user downloads the contents first for the user. For example, if a multimedia resource is less popular, the downloading speed is low. The user has to spend a long downloading time. If the user adopts the offline downloading technique provided by the example of the present disclosure, a server side of a service provider may download the multimedia resource for the user. The user may close the downloading tool or shut down the mobile device, so as to save time and power. After the offline downloading is finished, the user downloads the multimedia resource to his mobile device with a high downloading speed from the sever side. The offline downloading saves much waiting time of the user. More important, the mobile device user can save time, device resources and bandwidth to perform other operations. The principle of the offline downloading is as follows: (1) the user submits a downloading request via the client or a web interface (2) the server side of the operator receives the request and checks whether a downloading link submitted by the user has been downloaded before. If not, the server side starts multithread to download. If yes, the downloaded multimedia resource (or the link of the multimedia resource) is put in an offline storage space of the server side; (3) after the offline downloading is finished, the server side notifies the user. The user logs in the offline storage space and retrieves the multimedia resource. During this procedure, the multimedia resource may be obtained from users which have downloaded or are downloading the same file via a peer-to-peer (P2P) manner.

As to the transcoding, it supports conversion of an original multimedia resource to a multimedia resource in the target format designated by the user according to the target mobile device type selected by the user or the target format designated by the user.

In addition, the offline downloading and transcoding server cluster at the server side includes a server cluster on which an offline downloading function and a transcoding function are integrated, or includes two different server clusters which respectively perform the offline downloading function and the transcoding function. The task scheduling and managing server includes a server on which a task management function and a scheduling function are integrated, or includes two different servers respectively performing the task management function and the scheduling function. The storage server may be a server integrated in the offline downloading and transcoding server cluster.

In addition, the offline downloading and transcoding server cluster is adapted to submit its basic configuration information and load information to the task scheduling and managing server. The task scheduling and managing server allocates the offline downloading and transcoding task to the offline downloading and transcoding server cluster according to the basic confirmation information and the load information.

In addition, the offline downloading and transcoding server cluster submits a current downloading and transcoding progress to the task scheduling and managing server, and write a mapping record of a hash file generated by executing the offline downloading and transcoding task into a database. The database stores the mapping record of the hash file. The task scheduling and managing server obtains the current offline downloading and transcoding progress and provides to the client for inquiry.

In addition, after receiving the offline downloading and transcoding task request submitted by the client, the task scheduling and managing server determines according to the mapping record of the hash file stored in the database that there is the multimedia resource which has been downloaded offline and transcoded, and provides the multimedia resource which has been downloaded offline and transcoded to the client for preview or play.

In addition, the multimedia resource includes data slices. The client obtains the data slices from the storage server, submit, when needs to designate another slice which belongs to the same file with the slice currently played or previewed, an offset of the designated slice to the offline downloading and transcoding server cluster. The offline downloading and transcoding server cluster begins to perform the offline downloading and transcoding task from the slice designated by the user. Since the downloading and transcoding can be started from a designated position, the user is able to update the offline downloading and transcoding task at any moment according to a play/preview requirement. Thus, the user can obtain the data of the designated slice rapidly. And a better local play/preview effect is achieved.

Figure 2:
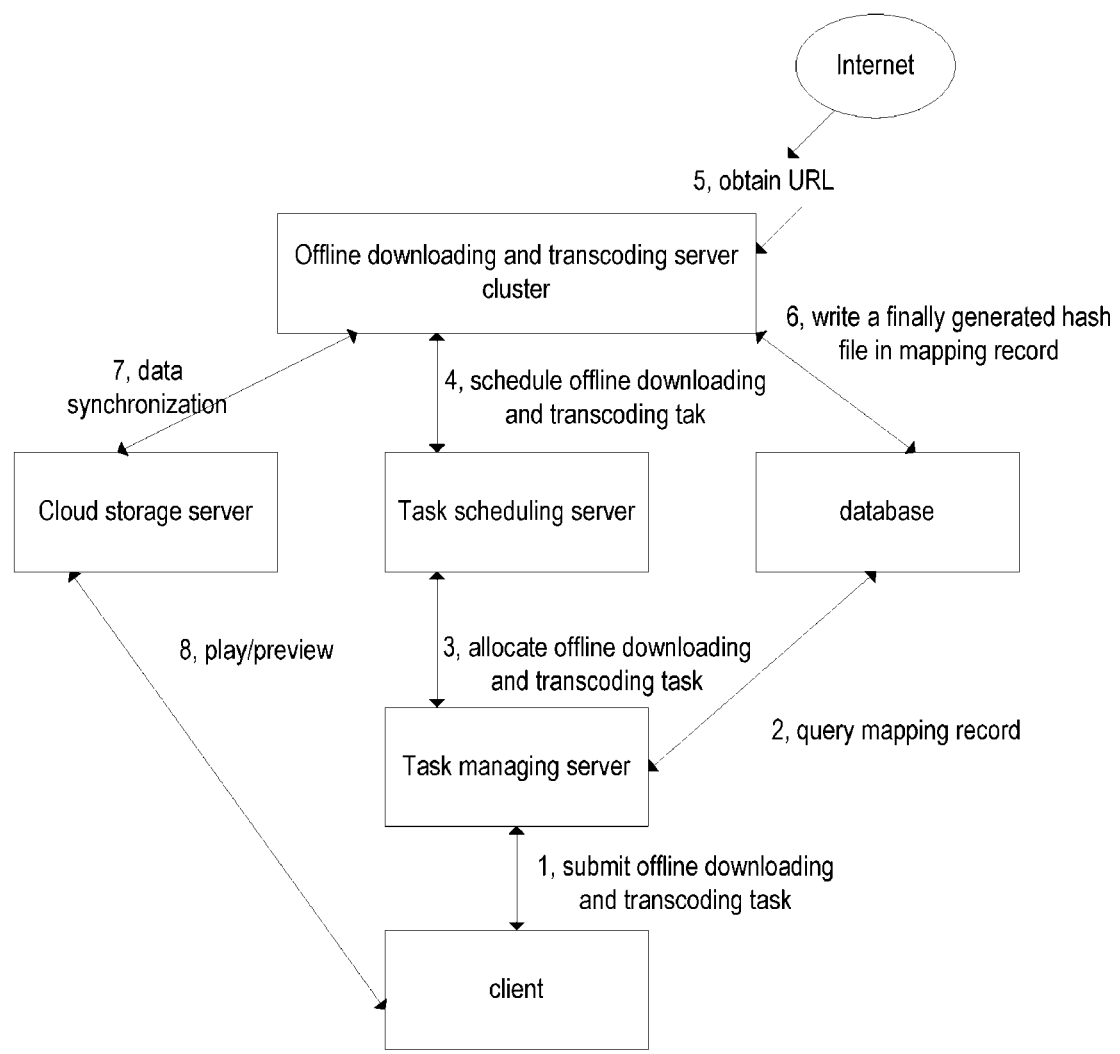
FIG. 2 is a schematic diagram illustrating a structure of a mobile multimedia real-time transcoding system based on offline downloading according to an example of the present disclosure.

FIG. 2 shows a system structure according to another example of the present disclosure. The task scheduling and managing server includes two different servers which respectively performs the task management function and the scheduling function, i.e., the task scheduling server and a task managing server. The storage server may be a cloud storage server.

Hereinafter, the devices in the example are described.

Client: (1) submit an offline transcoding original link of the offline downloading and transcoding task, e.g., a uniform/universal resource locator (URL), and a target mobile device type selected by the user or a target format designated by the user, so as to convert an original multimedia resource to a multimedia format required by different mobile devices, e.g., Android cellphone, or ipad platform, or detect the type of the current mobile device of the user and submits information to the task managing server; (2) if the user requires data of another slice which belongs to the same file with the current slice being played or previewed, the client submits an offset of the slice to the offline downloading and transcoding server cluster via the task managing server and the task scheduling server, such that the offline downloading and transcoding server execute the offline downloading and transcoding task from the designated slice to support dragging during the offline downloading and transcoding procedure; (3) retrieved data which has been downloaded offline and transcoded to the client for play/preview.

The client in the example of the present disclosure may include a generating module and a transmitting module.

The generating module is adapted to generate the offline downloading and transcoding task request, wherein the offline downloading and transcoding task request carries the target mobile device type selected by the user and the target format designated by the user.

The transmitting module is adapted to transmit the offline downloading and transcoding task request to the server side, so as to obtain the requested multimedia resource from the server side.

The offline downloading and transcoding server cluster: (1) Accept scheduling of the task scheduling server. (2) Download the original multimedia resource such as video or audio resource which requires offline downloading and transcoding according to the offline transcoding original link provided by the client, and store the resource in an offline storage space of the user. (3) Perform the offline downloading and transcoding operation according to the target mobile device type selected by the user or the target format designated by the user, transmit data slices of the multimedia resource generated by the offline downloading and transcoding to the cloud storage server for retrieval of the client; report an offline downloading and transcoding operation progress to the task scheduling server. (4) Provide a support for client when retrieving the transcoded resource after the offline downloading and transcoding is finished. (5) Registers its basic configuration information to the task scheduling server, address disk space, load information such as CPU load information, such that the task scheduling server performs dynamic and balanced scheduling according to the load information, and achieve a balance between watching definition and watching fluency. (6) Write a mapping record of a final hash file generated by the offline downloading and transcoding to the database.

The task scheduling server (1) Receive basic configuration information and load information reported by each node of the offline downloading and transcoding server cluster. (2) Dynamically allocate the offline downloading and transcoding task to different nodes of the offline downloading and transcoding server cluster according to the basic configuration information and the load information. (3) Receive the offline downloading and transcoding progress reported by the offline downloading and transcoding server cluster, and report the progress information to the task managing server. (4) Filter same offline downloading and transcoding task requests; for the same offline downloading and transcoding task requests, transmit only one of them to the offline downloading and transcoding server cluster, different users may share the offline downloading and transcoding progress of the same task.

The task managing server: (1) Receive the offline downloading and transcoding task request submitted by the client, generate a unique identifier for each independent offline downloading and transcoding task, (2) Provide the original link of the offline downloading and transcoding task to the task scheduling server. (3) Receive an offline downloading and transcoding task file slice change request submitted by the client, schedules the request to the task scheduling server. (4) Receive the offline downloading and transcoding progress information reported by the task scheduling server, and provide the offline transcoding progress to the client for inquiry. (5) If it is determined according to the mapping record that there is data which has been downloaded offline and transcoded, notify the client that the offline downloading and transcoding succeeds to realize a spike transcoding (cloud transcoding). (6) When the client needs to play and retrieve the data which has been downloaded offline and transcoded, provide an entry address for the client to retrieve the data.

Figure 3:
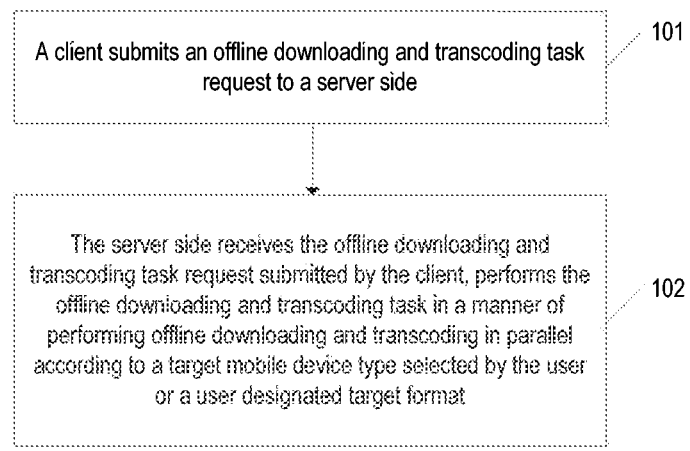
FIG. 3 is a flowchart illustrating a principle of a method according to an example of the present disclosure.

An example of the present disclosure also provides a mobile multimedia real-time transcoding method based on offline downloading. As shown in FIG. 3, the method includes the following.

At block 101, the client submits an offline downloading and transcoding task request to a server side.

Herein, the offline downloading and transcoding task request carries a target mobile device type selected by the user or a target format designated by the user.

At block 102, the server side receives the offline downloading and transcoding task request submitted by the client, executes an offline downloading and transcoding task in a manner of performing offline downloading and transcoding in parallel according to the target mobile device type selected by the user or the target format designated by the user.

Herein, if the server side has already had the multimedia resource which has been downloaded offline and transcoded, the multimedia resource may be found and provided to the client directly.

In addition, before accepting the scheduling, the method further includes; the offline downloading and transcoding server cluster submits its basic configuration information and load information to the task scheduling and managing server.

The scheduling includes: the task scheduling and managing server allocates the offline downloading and transcoding task to the offline downloading and transcoding server cluster according to the basic configuration information and load information submitted by the offline downloading and transcoding server cluster.

In addition, the method further includes: the offline downloading and transcoding sever cluster provides a current offline downloading and transcoding progress to the task scheduling and managing server, and writes a mapping record of a hash file generated by performing the offline downloading and transcoding task to a database.

In addition, after receiving the transcoding progress, the method further includes the task scheduling and managing server provides the transcoding progress to the client for inquiry.

In addition, after the task scheduling and managing server receives the offline downloading and transcoding task request, the method further includes: determine through querying the mapping record of the hash file stored in the database that there is a multimedia resource which has been downloaded offline and transcoded, provide the multimedia resource to the client for preview or play.

Furthermore, the multimedia resource includes data slices. The method further includes: the client obtains the data slices from the storage server, submits, when needs to designate another slice which belongs to the same file with the slice currently played or previewed, an offset of the designated slice to the offline downloading and transcoding server cluster, retrieve the data slice after the offline downloading and transcoding is performed to the client for play/preview. The offline downloading and transcoding server cluster starts the offline downloading and transcoding task from the slice designated by the user according to the offset of the slice.

A method example

This example includes the following.

Block 201, a user submits downloading information (including a URL, or an eMule downloading link, or BitTorrent seed file information), the client initiates an offline downloading and transcoding task request, selects a mobile device that the user plays the multimedia resource with, e.g., an Android cellphone, an ipad platform, or the client detects the type of the mobile device of the user.

At block 202, the task managing server forwards the offline downloading and transcoding task request received from the client to the task scheduling server. If the downloading address is an URL, the URL is forwarded. At the same time, the target mobile device type selected by the user or the target format designated by the user included in the request is also forwarded. After receiving the request, the task managing server queries the mapping record of the database. If it is detected according to the mapping record that there is a corresponding multimedia resource which has been downloaded offline and transcoded in the cloud storage server, the task managing server notifies the client and the client may start to play or preview and retrieve the corresponding multimedia resource.

At block 203, if there is no matching multimedia resource in the cloud storage server, the offline downloading and transcoding task request is forwarded to the task scheduling server.

At block 204, if the offline downloading and transcoding server cluster has different server clusters which respectively perform the offline downloading and the transcoding, the task scheduling server schedules the offline downloading task according to the load information of the offline downloading server cluster. The offline downloading server cluster starts the downloading according to the URL to download data from the Internet. After one data slice is downloaded, the transcoding server cluster may start to perform the transcoding task. Thus, the original multimedia resource is converted into a corresponding multimedia resource according to the target mobile device type selected by the user or the target format designated by the user. At the same time, the transcoding progress and intermediate state information are reported to the client.

Herein, after one video or audio file is transcoded, during the validity time of the offline storage space of the user, the video or audio file may be used by different users without transcoding again. It is only required to retrieve the file from the cloud storage server by occupying some network bandwidths. During the processing of one file or one data stream, the transcoding server cluster may convert the file or data stream into multiple target files with different resolutions, different code rates or different formats, which depends on the parameter of the mobile device carried in the offline downloading and transcoding task request initiated by the client, the target mobile device type selected by the user and the target format designated by the user.

At block 205, the client receives the transcoding progress, the client retrieves transcoded data from the transcoding server cluster, and the transcoded result and file mapping record are written in the database.

At block 206, the data slice which has been transcoded is transmitted to the cloud storage server for synchronization. The client obtains the data slice for play. If the mobile device wants to play another slice belongs to the same file with the current slice, the client initiates an offline downloading and transcoding task request again. Generally, an offset of the slice to be played is transmitted to the offline downloading and transcoding server cluster. The offline downloading and transcoding server cluster starts downloading and transcoding from the designated slice according to the offset.

It should be noted that, for the mapping record stored in the database in the example of the present disclosure, a mapping relationship of the transcoding format at the server side is as follows: the file before being transcoded is identified uniquely by a hash value of the contents of the file; the file after being transcoded is identified by the hash value of the contents of the file and a corresponding output mode (e.g., format, code stream, resolution and frame rate of the transcoding). A one-to-multiple relationship is established between the file before the transcoding and the file after the transcoding. The relationship mapping table is maintained by the task managing server. According to the mapping table, it can be determined whether a file has been transcoded into a format. Or, a file hash of a file before being transcoded corresponding to a file after being transcoded may be determined according to the mapping table. The mapping record is written by the offline downloading and transcoding server cluster in the database after an offline downloading and transcoding task is finished.

Those skilled in the art would know that the example of the present disclosure may be implemented as a method, a system or a computer program product. Therefore, the present disclosure may be implemented by hardware, software or a combination of software and hardware. In addition, the present disclosure may be a computer program product implemented on a computer readable storage medium (includes but is not limited to disk memory and optical memory) including a series of computer readable instructions.

The present disclosure is described with reference to flowchart and/or schematic diagrams of method, device (system), and computer program product. It should be noted that each flow and/or block in the flowchart and/or the schematic diagram, and a combination of the flow and/or block in the flowchart and/or schematic diagram may be implemented by computer readable instructions. The computer readable instructions may be provided to a general purpose computer, a dedicated computer, an embedded computer or a processor of other programmable data processing device, so as to implement an apparatus for performing functions of one or more flows in the flowchart and/or one or more blocks in the diagram.

The computer readable instructions may also be stored in a computer readable storage which may boot a computer or another programmable data processing device in a specific working manner, such that the instructions in the computer readable storage generates a product including an instruction apparatus, wherein the instruction apparatus implements functions of one or more flows in the flowchart and/of one or more blocks in the block diagram.

The computer program instructions may also be loaded on a computer or another programmable data processing device to perform a series of operations on the computer or the programmable data processing device to generate a computer implementation, such that the instructions in the computer readable storage generates a product including an instruction apparatus, wherein the instruction apparatus implements functions of one or more flows in the flowchart and/or one or more blocks in the block diagram.

Hereinafter, terms used in examples of the present disclosure are explained.

The client in the examples of the present disclosure is a downloading client which has an offline downloading capability.

The multimedia transcoding in the examples of the present disclosure is to convert a multimedia code stream which has been compression encoded into another multimedia code stream, so as to meet the requirements of different network bandwidths, different terminal processing abilities and different users. The transcoding first includes a procedure of decoding and then a procedure of encoding. The code streams before and after the transcoding may conform to the same multimedia encoding standard or different multimedia coding standards.

What has been described and illustrated herein is a preferred example of the disclosure along with some of its variations. Many variations are possible within the scope of the disclosure.

The invention claimed is:

1. A mobile multimedia real-time transcoding method, comprising:

receiving, by a server side, an offline downloading and transcoding task request for a multimedia resource submitted by a client, wherein the offline downloading and transcoding task request comprises a target mobile device type selected by a user or a user designated target format; and performing, by the server side, an offline downloading and transcoding task of the multimedia resource following scheduling and in a manner of performing offline downloading and transcoding in parallel according to the target mobile device type selected by the user or the user designated target format carried in the offline downloading and forwarding task request submitted by the client, and providing an obtained multimedia resource to the client, wherein the multimedia resource comprises data slices, and wherein the server side maintains the multimedia resource transcoded according to a plurality of target mobile device types or target formats to provide in response to receiving other requests for the multimedia resource that each comprise a target mobile device or a user designated target format of the plurality of target mobile devices or user designated target formats;

reporting, by an offline downloading and transcoding server cluster at the server side, basic configuration information and load information of the offline downloading and transcoding server cluster to a task scheduling and managing server; and the scheduling comprises: allocating, by the task scheduling and managing server, the offline scheduling and transcoding task to the offline downloading and transcoding server cluster according to the basic configuration information and the load information submitted by the offline downloading and transcoding server cluster, wherein the offline downloading and transcoding server cluster comprises an offline downloading server cluster and a transcoding server cluster respectively performing the offline downloading and the transcoding, wherein after one data slice is downloaded by the offline downloading server cluster, the transcoding server cluster starts transcoding the data slice, and the transcoded data slice is transmitted to a storage server, and wherein the providing the obtained multimedia resource to the client comprises:

providing by the storage server the transcoded data slice to the client for play.

2. The method of claim 1, further comprising:

reporting, by the offline downloading and transcoding server cluster, a current offline downloading and transcoding progress to the task scheduling and managing server, and writing, by the offline downloading and transcoding server cluster, a mapping record of a hash file generated by performing the offline downloading and transcoding task to a database.

3. The method of claim 2, further comprising:

after the task scheduling and managing server receives the offline downloading and transcoding task request, determining that there is a multimedia resource which has been downloaded offline and transcoded according to the mapping record of the hash file stored in the database, providing the multimedia resource which has been downloaded offline and transcoded to the client for preview or play.

4. A mobile multimedia real-time transcoding server, comprising: a task scheduling and managing server, an offline downloading and transcoding server cluster, a storage server; wherein the task scheduling and managing server is adapted to transmit an offline downloading and transcoding task request of a client for a multimedia resource, and schedule the distributed offline downloading and transcoding server cluster, wherein the multimedia resource comprises data slices;

the offline downloading and transcoding server cluster is distributed and is adapted to accept scheduling of the task scheduling and managing server, perform an offline downloading and transcoding task of the multimedia resource in a manner of performing offline downloading and transcoding in parallel according to a target mobile device type selected by the user or a target format designated by the user; and the storage server is adapted to store the multimedia resource which is downloaded and transcoded by the offline downloading and transcoding server cluster, and the storage server is adapted to maintain the multimedia resource transcoded according to a plurality of target mobile device types or target formats to provide in response to receiving other requests for the multimedia resource that each comprise a target mobile device or a user designated target format of the plurality of target mobile devices or user designated target formats, wherein the offline downloading and transcoding server cluster comprises an offline downloading server cluster and a transcoding server cluster respectively performing the offline downloading and the transcoding, wherein after the offline downloading server cluster downloads one data slice, the transcoding server cluster is adapted to start transcoding the data slice, and wherein the storage server is further adapted to receive the transcoded data slice and provide the transcoded data slice to the client for play.

5. The server of claim 4, wherein the offline downloading and transcoding server cluster is further adapted to submit basic configuration information and load information of the offline downloading and transcoding server cluster to the task scheduling and managing server; and the task scheduling and managing server is further adapted to allocate the offline downloading and transcoding task to the offline downloading and transcoding server cluster according to the basic configuration information and the load information of the offline downloading and transcoding server cluster.

6. The server of claim 4, wherein the offline downloading and transcoding server cluster is further adapted to submit a current offline downloading and transcoding progress to the task scheduling and managing server, and write a mapping record of a hash file generated by performing the offline downloading and transcoding task to a database;

the server further comprises the database, adapted to store the mapping record of the hash file;

the task scheduling and managing server is further adapted to provide the offline downloading and transcoding progress to the client for inquiry.

7. The server of claim 6, wherein the task scheduling and managing server is further adapted to determine, after receiving the offline downloading and transcoding task request of the client, that there is a multimedia resource which has been downloaded offline and transcoded through querying the mapping record of the hash file stored in the database, and provide the multimedia resource which has been downloaded offline and transcoded to the client for preview or play.

* * * * *